US011509828B1

(12) United States Patent
Jankowski et al.

(10) Patent No.: US 11,509,828 B1
(45) Date of Patent: *Nov. 22, 2022

(54) REAL-TIME IMAGE MOTION CORRECTION OR STABILIZATION SYSTEM AND METHODS FOR PROJECTILES OR MUNITIONS IN FLIGHT

(71) Applicant: Orbital Research Inc., Cleveland, OH (US)

(72) Inventors: Michael Jankowski, Winter Garden, FL (US); Douglas E. Russell, Canal Fulton, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,730

(22) Filed: Mar. 9, 2021

Related U.S. Application Data

(63) Continuation of application No. 16/907,593, filed on Jun. 22, 2020, now Pat. No. 10,979,643, which is a continuation of application No. 15/896,474, filed on Feb. 14, 2018, now Pat. No. 10,735,654.

(51) Int. Cl.
*H04N 5/232* (2006.01)
*F42B 10/02* (2006.01)

(52) U.S. Cl.
CPC ......... *H04N 5/23267* (2013.01); *F42B 10/02* (2013.01); *H04N 5/23254* (2013.01)

(58) Field of Classification Search
CPC .......... H04N 5/23267; H04N 5/23251; H04N 5/23254; H04N 5/23258; F42B 10/02; F42B 15/01; F42B 15/10
See application file for complete search history.

(56) References Cited

U.S. PATENT DOCUMENTS

| | | | |
|---|---|---|---|
| 8,648,285 B2 * | 2/2014 | Rastegar | F41G 7/30 244/3.14 |
| 9,677,864 B1 * | 6/2017 | Jankowski | G05D 1/0033 |
| 10,735,654 B1 * | 8/2020 | Jankowski | F42B 10/06 |
| 10,979,643 B1 * | 4/2021 | Jankowski | H04N 5/23254 |
| 2019/0154403 A1 * | 5/2019 | Choiniere | F41G 7/2253 |

* cited by examiner

*Primary Examiner* — Kelly L Jerabek
(74) *Attorney, Agent, or Firm* — Brian Kolkowski

(57) ABSTRACT

The present invention relates to projectiles and munitions, and more specifically to such in flight. More particularly the present invention relates to projectiles and munitions in flight equipped with one or more image sensors adapted for acquiring image data of the environment surrounding the projection or munition in flight. The present invention further relates to systems and methods for correcting or stabilizing motion effects and artifacts present in the image data related to the movement or motion of the projectile or munition in flight, including spin or rotation of the projectile or munition.

20 Claims, 3 Drawing Sheets

REAL-TIME IMAGE MOTION CORRECTION OR STABILIZATION SYSTEM AND METHODS FOR PROJECTILES OR MUNITIONS IN FLIGHT

CROSS-REFERENCE TO RELATED APPLICATIONS

This application is a continuation of U.S. patent application Ser. No. 16/907,593, which was filed on Jun. 22, 2020 as a continuation of U.S. patent application Ser. No. 15/896,474, which was filed on Feb. 14, 2018 and which issued as U.S. Pat. No. 10,735,654 on Aug. 4, 2020. The specifications and drawings of each of the above applications and patents are hereby incorporated by reference in their entirety.

BACKGROUND OF THE INVENTION

1. Field of the Invention

The present invention relates to projectiles and munitions, and more specifically to such in flight. More particularly the present invention relates to projectiles and munitions in flight equipped with one or more image sensors adapted for acquiring image data of the environment surrounding the projection or munition in flight. The present invention further relates to systems and methods for correcting or stabilizing motion effects and artifacts present in the image data related to the movement or motion of the projectile or munition in flight, including spin or rotation of the projectile or munition.

2. Technical Background

Image data acquired during movement is naturally affected by the motion and movement of the imaging sensor and/or the body to which the sensor is attached. High or low frequency vibrations, oscillations, and rotations of the sensor or body lead to those same vibrations, oscillations or rotations being translated into the image data yielding image information that is blurred and often unusable for purposes of providing any useful information. Thus, for image data to be of use, movement-related artifacts and errors must be corrected, or the image must be stabilized. Image stabilization techniques presently used in various technological arenas are well known for reducing blurring or other motion-related issues in images. Typical image stabilization techniques compensate for angular movement of the imaging device or sensor resulting from movement of the sensor itself or the body onto which the sensor is attached, but rotation compensation is also known.

Optical image stabilization (OIS) is one technique whereby the image projected onto the sensor is stabilized prior to the sensor converting the image data from analog to digital form. Generally there are two types of OIS: lens-based OIS and body-based OIS. Lens-based OIS is a mechanical technique implemented in the lens of the image sensor itself where the stabilization is performed by varying the optical path to the sensor. Lens-based OIS typically involve using a floating lens element that is generally electronically controlled and moved opposite to movement of the image sensor by using two angular velocity sensors, one to detect horizontal movement and one to detect vertical movement, thus correcting only for angular movement (pitch and yaw) but not rotation around the optical axis. Body-based OIS, rather than moving the lens, physically shift the entire image sensor opposite to the movement in order to counteract such movement. As the camera moves causing angular movement or error in the image data, angular motion sensors encode the movement to an actuator that moves the entire image sensor opposite to the sensed movement, thus maintaining the projection of the image onto the image plane. Lens-based OIS systems have several drawbacks in that each lens utilized needs to have an OIS integrated into it, and thus becomes very expensive, and not all lenses have OIS options. Further, lens-based OIS are not capable of correcting for sensor roll rotation. Body-based OIS are less expensive than lens-based because only one OIS is required and benefits any lens that is attached to the image sensor, but are typically much less effective providing lower quality results, particularly at longer focal lengths. Typically, body-based OIS are not able to correct for sensor roll rotation either, but may be equipped to do so with additional features such as an integrated electronic level, which add expense and complexity to the system. Further, body-based OIS do not actually stabilize the image projected to a viewfinder, but rather only stabilize image data converted to digital form and viewable on electronic viewfinders. Body-based OIS also have difficulty with lenses with variable focal lengths or lenses that do no report their focal length to the system. Body-based OIS are further limited by the range of movement of the image sensor within the body.

Digital or electronic image stabilization (EIS) techniques are also utilized in some areas. EIS systems typically operate by shifting the digital electronic image from frame to frame to compensate for motion between frames or images by using pixels outside the border of the visible frame to provide a buffer for the motion. EIS may be useful for reducing vibrations or such motion artifacts from video image data because it smooths the transition from one frame to another and does not affect the noise level of the image because it focuses on out-of-frame pixels. However, EIS does only that— only reduces the vibrations, it does not address actual motion blur existing in the image data, and thus often produces images that appear to lose focus as a result of the image compensation.

Stabilization filters are another technique for providing image motion correction or stabilization. Stabilization filters can correct a non-stabilized image by tracking the movement of pixels in the image and correcting the image by moving the frame. The process is similar to digital image stabilization but since there is no larger image to work with the filter either crops the image down to hide the motion of the frame or attempts to recreate the lost image at the edge through spatial or temporal extrapolation. Thus, like EIS, these filters do not actually address motion blur existing in the imaged data, but rather merely smooths the transition from one image or frame to the next without creating additional noise. Online services, including Google's YouTube, are also beginning to provide video stabilization as a post-processing step after content is uploaded. This has the disadvantage of not having access to the real-time gyroscopic data, but the advantage of more computing power and the ability to analyze images both before and after a particular frame.

Thus, it is an object of the present invention to provide image motion correction or stabilization systems and methods that are adapted to correct image motion in all axes of the image and movement, particularly in rotation about the optical axis. It is a further object of the present invention to provides such image motion correction or stabilization in real-time. It is still further an object of the present invention correct actual, existing motion in image data as occurring from motion during capture of the image data. It is yet further an object of the present invention to provide such image data motion correction or stabilization in a cost effective and versatile manner to be utilized in multiple form factors. It is still yet another object of the present invention to provide such image motion correction or stabilization for movement in image data collected during flight of projectiles or munitions.

SUMMARY OF THE INVENTION

The present invention is directed to image motion correction or stabilization methods and systems for various projectiles and munitions, including, but not limited to, 40 mm grenades, 120 mm mortars, and 155 mm artillery. The present invention may include one or more of various subsystems including control actuation systems (CAS), sensor suites (such as inertial measurement units (IMU) or individual sensors including at least one image sensor), and communications systems (e.g., transceiver) that are enabling subsystems and coincide with other systems that include features and components to operate interconnectedly and guide the projectile or round during flight. Preferably, where the system includes a CAS, it is a rugged, light-weight and low cost CAS. Also preferably, where a sensor suite is included, preferably the sensor suite is a compact or miniaturized unit with at least one image sensor, and preferably one or more IMUs or individual sensors adapted for measuring various movement or environmental conditions. Preferably, the communications system includes a power efficient situational awareness subsystem with telemetry communication between the systems and subsystems, and preferably for communication between the projectile or munition and a remote user, receiver or system. These subsystems comprise a flexible architecture with the ability to be affordably scaled for integration with various weapons platforms.

Control Actuation Systems (CASs) are utilized to create the control authority to maneuver the projectile or munition, or to extend the range thereof. The CAS of various embodiments of the present invention preferably utilizes a modular design that allows unique/custom features to be implemented on CASs targeted for other sized platforms to meet different performance requirements. Key scalable features include the retention, deployment and locking mechanisms of canards, the orientation and gearing of the motors to manipulate canards and the standard I/O configuration(s). These scalable features also enable the CAS to be designed with 2, 3 or 4 canards or channels, or other flow effectors of control surfaces. Even though the cost may increase as the CAS changes from a 2-channel CAS to a 4-channel CAS, the maneuverability dramatically increases as well as applicability to multiple other platforms. By changing the number of control surfaces, it also changes the type of control strategy from roll-to-turn control with the 2-channel CAS to skid-to-turn control with the 4-channel CAS. By successfully demonstrating these forms of maneuvering, the control architecture also becomes modular and scalable to other weapon platforms.

The present invention preferably utilizes a CAS comprising a DC motor, planetary gear and encoder that interfaces with a lead-screw design that provides high slew rates and high torque at various bandwidths for different applications. The motor may be a brushless DC (BLDC) motor, or a brushed (BDC) motor. The lead-screw comprises a customized nut and a gear profile machined into the canard barrel that allow the system to minimize the backlash of the CAS and modify as required to balance the torque, slew rates, and positional accuracy of the design when subjected to high-g/high-spin. The design of the gear interface is robust enough to withstand the high-vibratory and high-g launch environment, so that the contact tolerances remain intact and minimize alignment or frictional errors which may degrade performance.

The sensor suite of various embodiments of the present invention is also preferably scalable to fit various platforms and sizes of projectiles and munitions. The sensor suite preferably includes at least one IMU and at least one image sensor. The sensor suite is preferably integrated with the CAS to provide guidance and control outputs required to accurately maneuver the projectile or munition or to extend its range of flight. The sensor suite has a basic architecture to allow interface communication with a variety of sensors, motor controllers/drivers and power supply buses, etc. This flexibility allows the present invention to integrate the sensor suite with many known projectile rounds including, but not limited to, 40 mm and 120 mm precision-guided projectiles, and 155 mm ERPT. The sensor suite design will be scaled for the platforms discussed above, as well as increase its performance.

The present invention further utilizes a sensor suite preferably comprising an at least one image sensor adapted to acquire image data. The image sensor may be integrated with the sensor suite, or may be a separate, standalone image sensor that is in communication with the various subsystems of the present invention, including the sensor suite. The image sensor may be any type of image sensor adapted to acquire image data in any frequency spectrum, visible or non-visible. Examples of image sensors, or sensors adapted to acquire image data, include, but are not limited to, cameras, video cameras, infrared sensors, thermal imaging sensors, radar, sonar, flat panel detectors, ultra-violet sensors, spectral imaging sensors, and multi-spectral imaging sensors. Other optional embodiments may further include additional sensor(s) including additional image sensor and/or non-image sensors. Preferably, in such embodiments, an IMU with several sensors is used to provide measurements including, but not limited to, body rates, linear accelerations and magnetic disturbance data measurements useful for providing precise navigation and control of the munitions, missiles or projectiles. The IMU of the present invention may be used as a standalone IMU, or can be integrated into a guidance electronic unit (GEU)/IMU to be utilized with a CAS. The IMU preferably comprises one or more sensors in various combinations, such sensors including, but not limited to accelerometers, gyroscopes, magnetometers, GPS sensors and separate integrated sensor suites. Further, the systems of the present invention utilize a range of sensors adapted for measuring conditions and metrics that can be used for maneuvering or stabilizing the round during flight. The sensors, for example, may be used to determine the round's relative position with respect to a moving target or target location, the flow dynamics on the round's flow surface, and threats or obstacles in or around the round. The sensors for determining the round's relative position may include but are not limited to antennas for acquiring global positioning (GPS as mentioned above), magnetic sensors, solar detectors, and the like. The sensors for determining the flow dynamics may include but are not limited to a static and/or dynamic pressure sensor, shear stress sensor (hot film anemometer, a direct measurement floating-element shear stress sensor), inertial measurement unit or system, and other sensors known to those skilled in the art whose signal could be used to estimate or determine flow condition such as separation on the surface of the round, which would function as a trigger point for actuating the activatable flow effectors or active flow control devices or deploying the deployable flow effectors. The sensors for determining threats or obstacles in or around the aircraft or missile include but are not limited to radar detectors, laser detectors, chemical detectors, heat (or infrared) detectors, and the like. The sensors most useful for determining round flight parameters include accelerometers, magnetometers, IR sensors, rate gyros, and motor controller sensors. With particular regard to the object of the present invention to provide image motion correction or stabilization systems and methods, any of the additional (non-image) sensors that are employed may preferably be used in conjunction with the image sensor(s) to provide a hybrid background segmentation function. Non-image sensors, and particularly accelerometers, gyroscopes, and/or magnetometers can be used to inform the image motion correction or stabilization process by providing measurements relating to the projectile's or munition's movement or motion and the signals from such sensors can be used to help filter the image data. The movement data from the additional sensors can be used to help identify key features in the image data and to help the motion vector application process. More clearly and accurately performing these steps allows the motion correction or stabilization algorithm to more accurately identify movement in the image data and to correct and stabilize the image data. The system further preferably comprises a processor or controller, more preferably a microcontroller, to integrate and process the sensor signals in order to supply output data related to the conditions measured by the sensors. The processor or controller may be integrated into the sensor suite or may be a standalone processor controller in communication with the sensor(s), or sensor suite. The processor or controller can be predictive or can respond and actuate the activatable flow effectors or deploy the deployable flow effectors based on current conditions detected or measured by the sensor(s) or based on calculations based on the sensor signals. The controller preferably utilizes one or more digital microprocessors to process signals provided by the various sensors and deliver deployment, activation, or actuation commands to the deployable flow effectors, activatable flow effectors or active control surfaces of the present invention. Preferably, the present invention utilizes at least one image sensor, and also preferably includes at least one gyroscope, at least one accelerometer and at least one separate integrated sensor package consisting of at least one or more of these same types of sensors, thus providing redundancy. This redundancy in sensor(s) serves at least two beneficial purposes. First, it allows for a significant increase in precision with the customized separate sensor package but in a reduced sensor range (for example +/−16G, 2,000 dps). The firmware of the sensor suite is designed in such a manner that it will be able to adaptively switch between the separate integrated sensor package and the direct accelerometer/gyroscope combination in the sensor suite at the onset of saturation of each of the sensor's dynamic range. Second, this redundancy allows for an overdetermined system when used to estimate the state/orientation of the projectile. The outputs provided by the additional sensors are always available so that a robust, consistent solution will exist based on sensor suite outputs. The combination of individual sensors and the separate integrated sensor package allows the present invention to reduce footprint and increase capabilities of the sensor suite. An additional gyroscope may further be integrated to capture the high-spin environment prior to controlled flight. The sensor suite is preferably capable of adaptively transitioning between the gyroscope on separate integrated sensor package and that directly on the sensor suite.

The present invention still further utilizes, in many embodiments, a transceiver for communicating information between the fired munition, missile or projectile and a remote user or system. The transceiver is designed to send key information back to the remote user (e.g., warfighter) or system (e.g., guidance and monitoring control system), which can include images/video (EO/IR) and/or flight data (attitude, velocity, position, time of flight, etc.). This information is needed for target identification and prioritization. The transceiver is designed to be scalable for multiple caliber weapons or other platforms with varying concepts of operation (CONOPS). For example, the transceiver can be integrated with image sensors or imaging technology in a low velocity 40 mm round to provide the user with target detection, identification and tracking. Or, the transceiver can be integrated into a 40 mm surveillance/observation round in order to provide the user strategic battlefield information including assessing battle damage.

In this example, the imaging technologies, power management and integration information can be scaled among these varying applications. Other applications include communicating with UAVs/drones, performing target prioritization in flight and offering situational awareness information to the user. Preferably, the transceiver is a radio frequency (RF) transceiver that operates under a frequency-hopping spread spectrum (FHSS) method that rapidly changes and switches communication among a number of frequencies or channels in a pseudorandom sequence that is shared and known by both the transceiver and the remote interface. FHSS is a wireless technology that spreads its signal over rapidly changing frequencies. Each available frequency band is divided into sub-frequencies. Signals rapidly change ("hop") among these in a pre-determined order. Interference at a specific frequency will only affect the signal during that short interval. Further, the transceiver preferably communicates image and/or flight data in real-time. This real-time communication allows a remote user the ability to take control of the munition, missile or projectile and perform user-controlled flight from a remote location. The user is fed the image and flight data from the round in-flight, and through a user interface, send live commands or controls back to the round in flight to guide, maneuver or otherwise control the round.

Image data acquired during flight of a projectile or munition in naturally affected by the motion and movement of the projectile or munition. High or low frequency vibrations, oscillations, and rotations of the projectile or munition lead to those same vibrations, oscillations or rotations being translated into the image data yielding image information that is often unusable for purposes of providing any knowledge to the system or a remote user for tracking and/or guidance purposes. The present invention therefore preferably utilizes at least one image sensor adapted to acquire image data at least periodically, but preferably substantially continuously. The present invention identifies at least one key feature in the image data which becomes the focal point of the image processing procedure and image motion correction or stabilization. Once at least one key feature has been identified, subsequent images or frames are analyzed and vectors of motion are applied to the key feature in order to identify the amplitude and direction of the movement within the image data. An algorithm then preferably applies the applied vectors of motion for the identified key element based on subsequent images or frames, and adjusts, preferably in real-time, the image data to remove, correct, or stabilize any motion, particularly rotational motion about the optical axis, and thus provide a stabilized video image data format that can be used or location, surveillance, reconnaissance, guidance, or identification purposes.

Many other features of various embodiments of the present invention are novel or aid in the utility of the various embodiments of the present invention. The present invention may be constructed of custom alloys and/or composites to reduce the overall weight of the weapon platform, and to optimize the strength to weight ratio. Numerous alloys or composites may be used including, but not limited to Elektron® or other alloys including magnesium, aluminum, zinc, and/or calcium in various configurations and concentrations, magnesium metal foam matrix, Garolite or other glass-based phenolic fiber-reinforced composites, or the like. Flow effectors or control surfaces are stowed within the airframe so as to prevent premature deployment and only deploy on command. A novel deployment spring is utilized to attain full deployment of the flow effectors or control surfaces. The deployment spring is preferably recessed within the flow effector or control surface barrel and/or round. The deployment spring is preferably able to deploy in milliseconds.

In some embodiments the systems of the present invention utilize activatable flow effector or active flow control devices. The activatable flow effectors or active flow control devices of the present invention are unconventional flow surfaces that are electromechanical, electropneumatic, electrohydraulic, fluidic, and other types of devices, which can be used to create disturbances in the flow over the surface of the missile or aircraft. In some instances, preferably, the activatable flow effector or active flow control devices induce small disturbances, micro-vortices or perturbances in the vicinity or close proximity to the activatable flow effector or active flow control device. Further preferably, the activatable flow effector or active flow control device is flush or nearly flush, when deactivated, with the surface of the missile or aircraft to which it has been installed thereby creating little or no drag on the missile or aircraft when in an inactive state. In some instances, it is preferred that the activatable flow effector or active flow control devices have no hinged parts or surfaces. The activatable flow effector or active flow control devices of the present invention include but are not limited to active vortex generators, which are deployable, including but not limited to flow deflectors, balloons, microbubbles, and dimples or create active pressure active regions by suction or air pressure; synthetic jets including zero-net-mass synthetic jets; pulsed vortex generators; directed jets; vortex generating devices (fluidic and mechanical) plasma actuators including weakly ionized plasma actuators and single barrier dielectric discharge actuators; wall turbulators; porosity including but not limited to reconfigurable, inactive and active; microactuators; and thermal actuators.

The deployable flow effectors of the present invention may include deployable wings, canards, strakes, spoilers, body fins, tailfins/vertical stabilizers, tailplanes/horizontal stabilizers, and winglets. For the purposes of this application, these structures must be construed to have mutually exclusive meanings. For example, a canard is a forward-placed structure and/or control surface, oriented horizontally or at some small angle therefrom, placed ahead of a wing (or, in any case, forward of the center of gravity, where a wing would be) instead of behind it on an afterbody or tail, and is thus distinguished from a tailplane/horizontal stabilizer or a fin. These structures may comprise or may act as flaps, rudders, elevators, elevons, ailerons, and/or stabilators, as appropriate, each of which terms has a separate and distinct meaning in the art from the other terms and should not be blurred or confused when used in this application to claim or define certain structures. A person skilled in the art would appreciate that the named structures all function differently.

To prevent flow effector or control surface recoil, a locking pin is provided with a custom geometry. The tip of the locking pin may be tapered to allow easy entry into a channel which may be cut into the base of the flow effector or control surface. The pin may be spring actuated to force the locking pin to quickly slide into this channel and prevent the flow effector or control surface from recoiling and also firmly (i.e., with minimal play or slop) locking the flow effector or control surface in position with the flow effector or control surface barrel. The locking pin preferably includes a lock reset. The lock reset is preferably located within the flow effector or control surface barrel. The locking pin may hold the canard in place after deployment, and the reset assembly allows the canard to be retracted without having to disassemble the entire round. A gear interface may be machined in such a manner to minimize slop or play in the system. The flow effector or control surface barrel is preferably precisely rotated to attain desired deflection angles. The flow effector or control surface barrel preferably integrates a gear and bearing where machined gear teeth are utilized to reduce size and weight.

A Hall Effect sensor may be utilized in some embodiments of the present invention.

Such a sensor may be attached to or integrated with the flow effector or control surface barrel in order to measure the absolute position of the flow effectors or control surfaces.

Preferably, the control electronics, as well as many or all other components of the system, are g-hardened and distributed with a dedicated control circuit for each of the flow effectors or control surfaces. The control circuit preferably comprises one or more of a microcontroller, a motor control DSP, and a motor driver (full bridge) for either brushless or brushed DC motors. The present invention preferably includes a retention piece to hold the flow effector or control surface barrel in place after assembly. The flow effector or control surface barrel can be slid into its space and rotated to be locked in so that it cannot fall out during operation. This prevents the flow effector or control surface barrel from coming out while still allowing for the flow effector or control surface barrel to rotate freely.

Preferably, the flow effector or control surface barrel/gear interfaces with a position component. In one preferred embodiment, the position component is a lead screw that comprises a lead screw nut. Other possible position component configurations include crank arm systems, trunnion systems, ball or other joint systems and the like. For purposed of the present invention, the position component will be primarily referred to in the lead screw embodiment, though other position components known to those skilled in the art will be readily ascertained. The lead screw nut may have rack teeth directly cut into the lead screw nut. The outer profile or geometry of the lead screw nut can be designed to help keep the lead screw nut properly oriented to transfer the torque. Sections may be removed from lead screws so that the pieces can be tightly integrated with one another in such a confined space. The lead screw nut is customized to directly drive the flow effector or control surface barrel/gear. The linear motion translates directly to directional motion and torque while minimizing inefficiencies in the transmission. The lead screw and lead screw nut further have the added benefit of preventing back-drive of the flow effectors or control surfaces once they have been deployed. Often, in conventional designs, aerodynamic forces exerted on the flow effectors or control surfaces cause the flow effectors or control surfaces to move back along the deployment path and move out of fully deployed positions. The lead screw and lead screw nut of the present invention helps to lock the flow effectors or control surfaces into place such that they remain in place even in the presence of extremely high aerodynamic forces subjected thereupon.

Preferably, the control electronics and motor share a common housing. This allows the use of a common heat sink between the motor drivers and the motors which increases the efficiency of heat dissipation. Preferably, the g-hardened PCB has a dedicated control circuit for each channel of the CAS which includes a microcontroller, motor control—DSP, motor driver—full bridge IC (BLDC).

Various features, steps, and embodiments of the present invention are described in greater detail in other related patents and patent applications under the Assignee of the present application. Some of these related patents and applications include methods and systems for extended range and enhanced precision described in U.S. patent application Ser. No. 15/489,859 and U.S. Pat. Nos. 9,658,040, 9,086,258, and 9,395,167. Other such related patents and patent applications include systems and methods for ballistic apogee detection described in U.S. patent application Ser. No. 15/590,101 and U.S. Pat. No. 9,677,864. Still other such related patents and patent applications include control actuation systems and systems and methods for controlling flow on aircrafts, missiles and munitions described in U.S. patent application Ser. No. 15/631,272 and U.S. patent application Ser. No. 15/211,346 and U.S. Pat. Nos. 9,429,400, 8,191,833, 7,977,615, 7,226,015, 7,070,144, and 6,685,143. Yet other such related patents and patent applications include hierarchical closed-loop flow control systems and methods described in U.S. patent application Ser. Nos. 15/057,211 and 11/311,767, as well as U.S. Pat. Nos. 9,310,166, 8,548,65, 8,417,395, 8,190,305, and 6,685,143. Each of the above patents and patent applications are hereby incorporated by reference.

One embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising an algorithm, the processor and algorithm adapted to receive image data from the at least one sensor; capturing periodic or substantially continuous image data with the at least one sensor during flight of the projectile or munition; identifying at least one key feature in the image data; applying vectors of motion corresponding to the at least one key feature in the image data; estimating motion of the image sensor based on the vectors of motion corresponding to the identified at least one key feature in the image data; and correcting or stabilizing movement of the image data based at least in part on the vectors of motion and the estimated motion of the image sensor.

Another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising an algorithm, the processor and algorithm adapted to receive image data from the at least one sensor; capturing periodic or substantially continuous image data with the at least one sensor during flight of the projectile or munition; identifying at least two key features in the image data; applying vectors of motion corresponding to the at least two key features in the image data; estimating motion of the image sensor based on the vectors of motion corresponding to the identified at least two key features in the image data; and correcting or stabilizing movement of the image data based at least in part on the vectors of motion and the estimated motion of the image sensor.

Yet another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising an algorithm, the processor and algorithm adapted to receive image data from the at least one sensor; capturing periodic or substantially continuous image data with the at least one sensor during flight of the projectile or munition; identifying at least two key features in the image data; applying vectors of motion corresponding to the at least two key features in the image data; estimating motion of the image sensor based on the vectors of motion corresponding to the identified at least one key feature in the image data; and correcting or stabilizing movement of the image data based at least in part on the vectors of motion and the estimated motion of the image sensor, wherein motion of the image data exhibits an amplitude of about 25 degrees or more and a frequency of about 0.1 Hz or greater.

Still another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising an algorithm, the processor and algorithm adapted to receive image data from the at least one sensor; capturing periodic or substantially continuous image data with the at least one sensor during flight of the projectile or munition; identifying at least two key features in the image data; applying vectors of motion corresponding to the at least two key features in the image data; estimating motion of the image sensor based on the vectors of motion corresponding to the identified at least two key features in the image data; and correcting or stabilizing movement of the image data based at least in part on the vectors of motion and the estimated motion of the image sensor, wherein motion of the image data exhibits an amplitude of about 25 degrees or more and a frequency of about 0.1 Hz or greater.

Even another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least one key feature in the image data with a feature selection algorithm; applying vectors of motion corresponding to the at least one key feature in the image data with a motion vector application algorithm; estimating motion of the image sensor based on the vectors of motion corresponding to the identified at least one key feature in the image data with a motion estimation algorithm; and correcting or stabilizing movement of the image data based at least in part on the vectors of motion and the estimated motion of the image sensor with a stabilization algorithm.

Yet still another embodiment of the present invention includes method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least one key feature in the image data with a feature selection algorithm; applying vectors of motion corresponding to the at least one key feature in the image data with a motion vector application algorithm; estimating motion of the image sensor based on the vectors of motion corresponding to the identified at least one key feature in the image data with a motion estimation algorithm; and correcting or stabilizing movement of the image data based at least in part on the vectors of motion and the estimated motion of the image sensor with a smoothing algorithm and a movement cancellation algorithm.

Still even another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least two key features in the image data with a feature selection algorithm; applying vectors of motion corresponding to the at least two key features in the image data with a motion vector application algorithm; estimating motion of the image sensor based on the vectors of motion corresponding to the identified at least two key features in the image data with a motion estimation algorithm; and correcting or stabilizing movement of the image data based at least in part on the vectors of motion and the estimated motion of the image sensor with a stabilization algorithm.

Even yet another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least two key features in the image data with a feature selection algorithm; applying vectors of motion corresponding to the at least two key features in the image data with a motion vector application algorithm; estimating motion of the image sensor based on the vectors of motion corresponding to the identified at least two key features in the image data with a motion estimation algorithm; and correcting or stabilizing movement of the image data based at least in part on the vectors of motion and the estimated motion of the image sensor with a smoothing algorithm and a movement cancellation algorithm. Still yet another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least one key feature in the image data with a feature selection algorithm; applying vectors of motion corresponding to the at least one key feature in the image data with a motion vector application algorithm; estimating motion of the image sensor based on the vectors of motion corresponding to the identified at least one key feature in the image data with a motion estimation algorithm; and correcting or stabilizing movement of the image data based at least in part on the vectors of motion and the estimated motion of the image sensor with a stabilization algorithm, wherein motion of the image data exhibits an amplitude of about 25 degrees or more and a frequency of about 0.1 Hz or greater.

Yet even another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least one key feature in the image data with a feature selection algorithm; applying vectors of motion corresponding to the at least one key feature in the image data with a motion vector application algorithm; estimating motion of the image sensor based on the vectors of motion corresponding to the identified at least one key feature in the image data with a motion estimation algorithm; and correcting or stabilizing movement of the image data based at least in part on the vectors of motion and the estimated motion of the image sensor with a smoothing algorithm and a movement cancellation algorithm, wherein motion of the image data exhibits an amplitude of about 25 degrees or more and a frequency of about 0.1 Hz or greater.

Even still another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least two key features in the image data with a feature selection algorithm; applying vectors of motion corresponding to the at least two key features in the image data with a motion vector application algorithm; estimating motion of the image sensor based on the vectors of motion corresponding to the identified at least two key features in the image data with a motion estimation algorithm; and correcting or stabilizing movement of the image data based at least in part on the vectors of motion and the estimated motion of the image sensor with a stabilization algorithm, wherein motion of the image data exhibits an amplitude of about 25 degrees or more and a frequency of about 0.1 Hz or greater.

Yet still even another embodiment of the present invention includes a method of performing real-time image motion correction or stabilization for a projectile or munition comprising steps of: firing, launching, or deploying a projectile or munition, the projectile or munition comprising at least one sensor adapted to acquire image data and a processor comprising at least one algorithm, the processor and algorithm adapted to receive image data from the at least one sensor; capturing periodic or substantially continuous image data with the at least one sensor during flight of the projectile or munition; identifying at least two key features in the image data with a feature selection algorithm; applying vectors of motion corresponding to the at least two key features in the image data with a motion vector application algorithm; estimating motion of the image sensor based on the vectors of motion corresponding to the identified at least two key features in the image data with a motion estimation algorithm; and correcting or stabilizing movement of the image data based at least in part on the vectors of motion and the estimated motion of the image sensor with a smoothing algorithm and a movement cancellation algorithm, wherein motion of the image data exhibits an amplitude of about 25 degrees or more and a frequency of about 0.1 Hz or greater.

Yet still even another embodiment of the present invention includes a real-time image motion correction or stabilization system for projectiles or munitions comprising system comprising: a projectile or munition body; at least one image sensor attached to or integrated into the projectile or munition body; a processing element mounted within the projectile or munition body; a feature selection algorithm; a motion vector application algorithm; a motion estimation algorithm; a correction or stabilization algorithm; and a system output corresponding to corrected or stabilized image data.

Still even yet another embodiment of the present invention includes a real-time image motion correction or stabilization system for projectiles or munitions comprising system comprising: a projectile or munition body; at least one image sensor attached to or integrated into the projectile or munition body; a processing element mounted within the projectile or munition body; a feature selection algorithm; a motion vector application algorithm; a motion estimation algorithm; a smoothing algorithm; a movement cancellation algorithm; and a system output corresponding to corrected or stabilized image data.

Even yet still another embodiment of the present invention includes a real-time image motion correction or stabilization system for projectiles or munitions comprising system comprising: a projectile or munition body comprising at least one image sensor, and a control actuation system (CAS) comprising at least one processing element and at least one activatable flow effector; a feature selection algorithm; a motion vector application algorithm; a motion estimation algorithm; a correction or stabilization algorithm; and a system output corresponding to corrected or stabilized image data, wherein the CAS is adapted to maneuver or stabilize the projectile or munition based at least in part on the system output.

Still yet even another embodiment of the present invention includes a real-time image motion correction or stabilization system for projectiles or munitions comprising system comprising: a projectile or munition body comprising at least one image sensor, and a control actuation system (CAS) comprising at least one processing element and at least one activatable flow effector; a feature selection algorithm; a motion vector application algorithm; a motion estimation algorithm; a smoothing algorithm; a movement cancellation algorithm; and a system output corresponding to corrected or stabilized image data, wherein the CAS is adapted to maneuver or stabilize the projectile or munition based at least in part on the system output.

Yet even still another embodiment of the present invention includes a real-time image motion correction or stabilization system for projectiles or munitions comprising system comprising: a projectile or munition body comprising at least one image sensor, a transceiver adapted for two-way communication with a remote user or system, and a control actuation system (CAS) comprising at least one processing element and at least one activatable flow effector; a feature selection algorithm; a motion vector application algorithm; a motion estimation algorithm; a correction or stabilization algorithm; and a system output corresponding to corrected or stabilized image data, wherein the transceiver is adapted to transmit at least the system output to a remote user or system and to receive commands from the remote user or system corresponding to maneuvering or stabilizing the projectile or munition.

Even still yet another embodiment of the present invention includes a real-time image motion correction or stabilization system for projectiles or munitions comprising system comprising: a projectile or munition body comprising at least one image sensor, a transceiver adapted for two-way communication with a remote user or system, and a control actuation system (CAS) comprising at least one processing element and at least one activatable flow effector; a feature selection algorithm; a motion vector application algorithm; a motion estimation algorithm; a smoothing algorithm; a movement cancellation algorithm; and a system output corresponding to corrected or stabilized image data, wherein the transceiver is adapted to transmit at least the system output to a remote user or system and to receive commands from the remote user or system corresponding to maneuvering or stabilizing the projectile or munition. Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention. They are not, however, intended to be limiting or to illustrate all envisioned embodiments.

DETAILED DESCRIPTION OF THE INVENTION AND DRAWINGS

Figure 1:
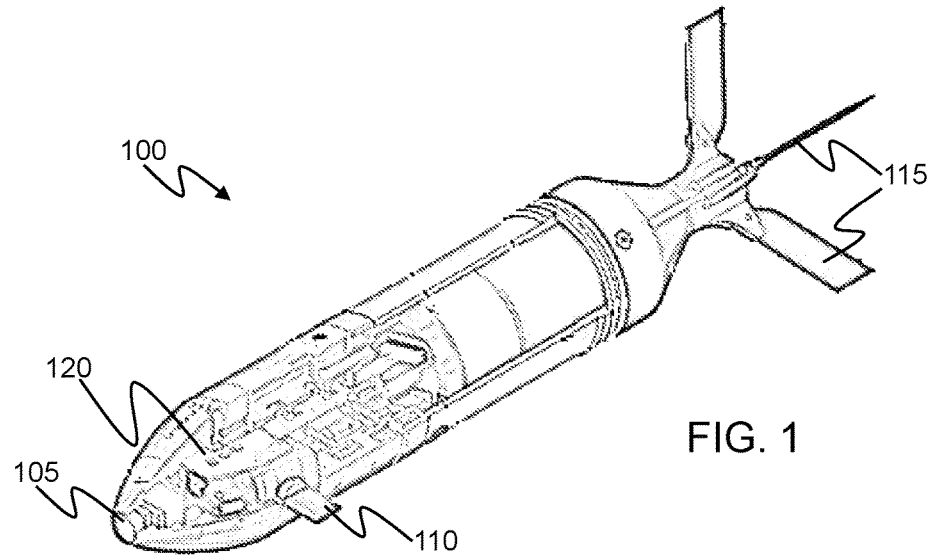
FIG. 1. Picture depicting a projectile or munition equipped with at least one image sensor and processing components for correcting or stabilizing motion of image data acquired during flight of the projectile or munition.

The present invention relates to projectiles and munitions, and more specifically to such in flight. More particularly the present invention relates to projectiles and munitions in flight equipped with one or more image sensors adapted for acquiring image data of the environment surrounding the projection or munition in flight. The present invention further relates to systems and methods for correcting or stabilizing motion effects and artifacts present in the image data related to the movement or motion of the projectile or munition in flight, including spin or rotation of the projectile or munition.

The present invention preferably operates in real-time. Real-time operation in regards to the present invention pertains to carrying out the image motion correction or stabilization process which includes, in many embodiments, the amount of time it takes for image sensors to acquire or capture image data, to transmit and process the image data, to identify key features in the image, to apply motion vectors to the image data, and for the algorithm to correct the motion based on the identified key feature and applied motion vectors. Preferably, by real-time operation, it means that the image motion correction or stabilization process can produce a corrected or stabilized image within 5 minutes of acquiring or capturing image data. More preferably, by real-time operation, it means that the image motion correction or stabilization process can produce a corrected or stabilized image within 3 minutes of acquiring or capturing image data. Still more preferably, by real-time operation, it means that the image motion correction or stabilization process can produce a corrected or stabilized image within 1 minute of acquiring or capturing image data. Yet more preferably, by real-time operation, it means that the image motion correction or stabilization process can produce a corrected or stabilized image within 30 seconds of acquiring or capturing image data. Even more preferably, by real-time operation, it means that the image motion correction or stabilization process can produce a corrected or stabilized image within 1 second of acquiring or capturing image data. Yet still more preferably, by real-time operation, it means that the image motion correction or stabilization process can produce a corrected or stabilized image within 750 milliseconds of acquiring or capturing image data. Still even more preferably, by real-time operation, it means that the image motion correction or stabilization process can produce a corrected or stabilized image within 500 milliseconds of acquiring or capturing image data. Even yet more preferably, by real-time operation, it means that the image motion correction or stabilization process can produce a corrected or stabilized image within 250 milliseconds of acquiring or capturing image data. Still yet more preferably, by real-time operation, it means that the image motion correction or stabilization process can produce a corrected or stabilized image within 1 millisecond of acquiring or capturing image data. Yet even more preferably, by real-time operation, it means that the image motion correction or stabilization process can produce a corrected or stabilized image within 500 microseconds of acquiring or capturing image data. Even still more preferably, by real-time operation, it means that the image motion correction or stabilization process can produce a corrected or stabilized image within 100 microseconds of acquiring or capturing image data. Most preferably, by real-time operation, it means that the image motion correction or stabilization process can produce a corrected or stabilized image substantially simultaneously with acquiring or capturing image data.

The present invention is also preferably adapted to operate in highly dynamic environments where the image data is subjected to and exhibits harsh movement, and specifically in high amplitudes of motion about any axis. Preferably, the systems and methods of the present invention are adapted to correct or stabilize image motion data in any axis, but particularly of rotation about the optical axis where the amplitude of the motion is greater than about 1 degree. More preferably, the systems and methods of the present invention are adapted to correct or stabilize image motion data in any axis, but particularly of rotation about the optical axis where the amplitude of the motion is greater than about 3 degrees. Still more preferably, the systems and methods of the present invention are adapted to correct or stabilize image motion data in any axis, but particularly of rotation about the optical axis where the amplitude of the motion is greater than about 5 degrees. Yet more preferably, the systems and methods of the present invention are adapted to correct or stabilize image motion data in any axis, but particularly of rotation about the optical axis where the amplitude of the motion is greater than about 7 degrees. Even more preferably, the systems and methods of the present invention are adapted to correct or stabilize image motion data in any axis, but particularly of rotation about the optical axis where the amplitude of the motion is greater than about 10 degrees. Still yet more preferably, the systems and methods of the present invention are adapted to correct or stabilize image motion data in any axis, but particularly of rotation about the optical axis where the amplitude of the motion is greater than about 12 degrees. Yet even more preferably, the systems and methods of the present invention are adapted to correct or stabilize image motion data in any axis, but particularly of rotation about the optical axis where the amplitude of the motion is greater than about 15 degrees. Even still more preferably, the systems and methods of the present invention are adapted to correct or stabilize image motion data in any axis, but particularly of rotation about the optical axis where the amplitude of the motion is greater than about 17 degrees. Yet still more preferably, the systems and methods of the present invention are adapted to correct or stabilize image motion data in any axis, but particularly of rotation about the optical axis where the amplitude of the motion is greater than about 20 degrees. Still even more preferably, the systems and methods of the present invention are adapted to correct or stabilize image motion data in any axis, but particularly of rotation about the optical axis where the amplitude of the motion is greater than about 22 degrees. Even yet more preferably, the systems and methods of the present invention are adapted to correct or stabilize image motion data in any axis, but particularly of rotation about the optical axis where the amplitude of the motion is greater than about 25 degrees.

With further regard to the present invention preferably being adapted to operate in highly dynamic environments where the image data is subjected to and exhibits harsh movement, further preferably the system is adapted to correct or stabilize image motion data with a high frequency of movement or rotation in any axis. Preferably, the systems and methods of the present invention are adapted to correct or stabilize image motion data in any axis, but particularly of rotation about the optical axis where the frequency of the motion or rotation is greater than about 0.05 Hz. More preferably, the systems and methods of the present invention are adapted to correct or stabilize image motion data in any axis, but particularly of rotation about the optical axis where the frequency of the motion or rotation is greater than about 0.1 Hz. Yet more preferably, the systems and methods of the present invention are adapted to correct or stabilize image motion data in any axis, but particularly of rotation about the optical axis where the frequency of the motion or rotation is greater than about 0.15 Hz. Still more preferably, the systems and methods of the present invention are adapted to correct or stabilize image motion data in any axis, but particularly of rotation about the optical axis where the frequency of the motion or rotation is greater than about 0.2 Hz. Even more preferably, the systems and methods of the present invention are adapted to correct or stabilize image motion data in any axis, but particularly of rotation about the optical axis where the frequency of the motion or rotation is greater than about 0.25 Hz. Yet even more preferably, the systems and methods of the present invention are adapted to correct or stabilize image motion data in any axis, but particularly of rotation about the optical axis where the frequency of the motion or rotation is greater than about 0.30 Hz. Even still more preferably, the systems and methods of the present invention are adapted to correct or stabilize image motion data in any axis, but particularly of rotation about the optical axis where the frequency of the motion or rotation is greater than about 0.35 Hz. Still yet more preferably, the systems and methods of the present invention are adapted to correct or stabilize image motion data in any axis, but particularly of rotation about the optical axis where the frequency of the motion or rotation is greater than about 0.4 Hz. Even yet more preferably, the systems and methods of the present invention are adapted to correct or stabilize image motion data in any axis, but particularly of rotation about the optical axis where the frequency of the motion or rotation is greater than about 0.5 Hz. Yet still more preferably, the systems and methods of the present invention are adapted to correct or stabilize image motion data in any axis, but particularly of rotation about the optical axis where the frequency of the motion or rotation is greater than about 0.75 Hz. Still even more preferably, the systems and methods of the present invention are adapted to correct or stabilize image motion data in any axis, but particularly of rotation about the optical axis where the frequency of the motion or rotation is greater than about 1 Hz. Still even yet more preferably, the systems and methods of the present invention are adapted to correct or stabilize image motion data in any axis, but particularly of rotation about the optical axis where the frequency of the motion or rotation is greater than about 5 Hz. Even yet still more preferably, the systems and methods of the present invention are adapted to correct or stabilize image motion data in any axis, but particularly of rotation about the optical axis where the frequency of the motion or rotation is greater than about 10 Hz.

Various embodiments of the present invention include the step of firing, launching, or deploying a projectile or munition. The exact method of firing, launching, or deploying the projectile or munition depends on the form factor of the particular embodiment. Many embodiments of the present invention employ a gun-fired round. Such embodiments typically utilize a propellant substance that is ignited causing an explosive charge propelling the round from the gun barrel. Other embodiments, such as mortar rounds, operate in a similar manner to gun-fired rounds using a propellant that is ignited to propel the mortar round from the barrel, with the general difference that mortar rounds are typically muzzle-loaded whereas gun fired rounds are loaded into a breach or chamber in the gun body. In either system, the propellant is ignited which creates a force behind the projectile portion which is propelled through and out of the barrel of the weapon. Still other embodiments use an air-dropped or otherwise unpowered projectile or munition. Often such embodiments take the form of a projectile or munition released from an aircraft and allowed to fall away therefrom. These embodiments may include bombs and other such explosive rounds as well as reconnaissance or surveillance rounds that are often parachute-deployed rounds that fall slowly while capturing image data of the surrounding area. Regardless of the method of firing, launching, or deploying the, once in flight, many projectiles, munitions, or rounds of any type are prone to spinning or rotation, sometimes at very high rates. For such projectiles, munitions or rounds with image sensors, the present invention is directed to correcting or stabilizing the effects of motion and spin in the image data. Various embodiments of the present invention include a further step of capturing periodic or substantially continuous image data with the at least one sensor during flight of the projectile or munition. Image sensors adapted to acquire image data, include, but are not limited to, cameras, video cameras, infrared sensors, thermal imaging sensors, radar, sonar, flat panel detectors, ultra-violet sensors, spectral imaging sensors, multi-spectral imaging sensors, and the like. Each type of image sensor operates in a manner known to those skilled in the art and may be employed in the present invention in their intended arrangements and uses. As employed on a projectile or munition, the image sensor is used to capture or acquire image data at least during flight of the projectile or munition. Typically, image data is not particularly valuable prior to firing, launching or deployment, and during fire, launch or deployment the movement is far too volatile for most image sensors and/or image correction or stabilization systems and methods to produce useful, coherent data. Further, particularly with respect to the objects of the present invention, image data during flight of the projectile or munition, when such image data is useful for numerous purposes such as orientation, location, guidance, target identification, target locking, target switching, reconnaissance, surveillance, or the like, is the most useful image data and thus is the most efficacious in terms of applying image motion correction or stabilization techniques.

Various embodiments of the present invention further include the step of identifying at least two key features in the image data. This step involves identifying a particular feature in the image data that is consistently (not necessarily constantly) present and regularly identifiable in successive frames or pieces of image data. This key feature may be any point of interest in the image data. For example, there may be a landmark in the image data such as a building, vehicle, mountain, or other such identifiable feature of the landscape that can be locked onto in successive images or frames of image data. However, the key feature may be a feature of the image data itself, such as one or more pixels or voxels of the image data. The exact key feature(s) selected depends on the resolution of the image, the volatility of the movement or rotation, the processing power available, and many other factors. Effectively, any feature that is identifiable in successive images or frames of image data makes for an effective key feature to be identified for image motion correction or stabilization purposes. The processor and algorithm identify at least one such key feature in the image data and track that one or more feature through successive frames of image data. More specifically, preferably a feature selection algorithm is used in order to identify key feature(s) in the image data. In one non-limiting example, a feature selection algorithm focusing on image pixels or voxels as key feature(s) of the image data initially calculates a corner quality at every pixel or voxel in the image data by calculating a covariation matrix of derivatives and computing eigenvalues, then finally determining a quality measure (A) that is calculated according to Equation 1:

$$\wedge = \min(eig-1, eig-2) > thrs\_noise \qquad \text{Equation 1:}$$

where "thrs_noise" is a predefined noise threshold value. In one preferred embodiment, the threshold noise value is set to 10% of the maximum quality value measured in the image points with a minimal eigenvalue less than the noise threshold are rejected, and the remaining features (pixels or voxels) are sorted by their calculated quality measure (e.g., in descending order of quality measure). Based on this sorted order, the feature(s) with the highest quality can be selected and identified as the key feature(s) in the image data for purposes of tracking movement within the image data.

Various embodiments of the present invention further include the step of applying vectors of motion corresponding to the at least one key feature in the image data. As noted above, the key feature is tracked through successive images or frames of image data. This actual movement of the key feature(s) between successive images or frames of image data is preferably used by the processor and a motion vector application algorithm to calculate vectors of motion that characterize the movement of the key feature(s) within the image data. These vectors of motion are mathematical representations of the movement of the key feature(s) with movement parameters including direction and distance or amplitude of the movement. These vectors of motion become an identification tool that allows the system, and the processor and algorithm, to estimate the movement of the various system components, and particularly the image sensor, during flight or travel of the projectile or munition.

Various embodiments of the present invention include the step of estimating motion of the image sensor based on the vectors of motion corresponding to the one or more key features in the image data. As the system tracks the key feature(s) from one image or frame of image data to the next and vectors of motion are applied characterizing the movement of the key feature(s) in the image data, the system can correlate the distances and directions of movement of the key feature. Further, correlating the parameters of the movement with time data, such as via a time stamp or other meta data associated with each image or frame of image data, the system is preferably adapted to calculate an estimated movement of the image sensor. Preferably, the system is adapted to perform this step using the processor and a motion estimation algorithm that operates according to these principles. This estimation of the image sensor movement is, as noted, based on the parameters of movement of the key feature(s) in the image data and the amount of time it takes to perform such movement. Accordingly, the movement of the key feature in the image data can be directly used to estimate the movement of the image sensor, where such movement is the basis of image motion blurring or errors, and thus allows the system to apply image motion correction or stabilization techniques to reduce or eliminate perceived motion artifacts between images or frames of image data.

Another step of the various embodiments of the present invention includes correcting or stabilizing movement of the image data based at least in part on the vectors of motion and the estimated motion of the image sensor. Once the vectors of motion are applied to the key feature(s) of the image data and the motion of the image sensor is estimated based on those vectors of motion, the system can use that information to calculate the movement that occurs between successive images or frames of image data. Thus, the processor and algorithm can apply a shift to successive images or frames of image data in order to counteract the movement of the image sensor and to align those successive images or frames of image data. This alignment of images or frames yields image data that has a significantly reduced, if not eliminated, motion effect or artifact, and thus is corrected or stabilized image data that is much more readily observed, understood and analyzed. The actual image data correction or stabilization process may use a single correction and stabilization algorithm that performs all of the required functions described herein. Alternatively, the image motion correction or stabilization process may employ one or more separate algorithms to perform the correction or stabilization process in steps either in sequence or substantially simultaneously. Where separate algorithms are employed, a first algorithm is preferably a smoothing algorithm which aims to blend successive images or frames together in a manner that smooths out the movement between images or frames of image data to reduce the rapid, jittery, blurring motion artifacts caused by the movement of the image sensor. A second algorithm of the separate algorithm method is preferably a movement cancellation algorithm that aims to fine tune the smoothed successive images or frames in order to more fully remover, or preferably eliminate, the appearance of motion effects and artifacts between successive images or frames by more precisely aligning those successive images or frames. In total, the image motion correction or stabilization process may involve each of the feature selection and identification algorithm, the motion vector application algorithm, the motion estimation algorithm, and a stabilization algorithm or a combination of smoothing and movement cancellation algorithms. All of these algorithms may be considered together as a single image motion correction or stabilization algorithm. Now referring to the drawings and figures, FIG. 1 is a picture depicting a projectile or munition equipped with at least one image sensor and processing components for correcting or stabilizing motion of image data acquired during flight of the projectile or munition. The depicted projectile or munition 100 is merely representative of any type of projectile, munition or other body described herein for use in various embodiments of the present invention, and is not intended to be limiting to any one form factor for the projectile or munition. In the depicted embodiment, the projectile or munition 100 comprises at least one image sensor 105 that is adapted to acquire image data, particularly during flight of the projectile or munition 100. Further comprised in the projectile or munition are flight control components adapted for helping maneuver or extend the range of flight of the projectile or munition. Such flight control components in the depicted embodiment include activatable flow effectors 110 (in the present embodiment depicted as canards) that are able to be stowed within the body of the projectile or munition 100 at the time of fire, launch or deployment and later activated during flight to help provide maneuverability or range extension, as well as tail fins 115, which as depicted, are also activatable in that they are in a folded or closed state during firing, launch or deployment of the projectile or munition 100, but after firing launch or deployment are activated into an open or extended position. The flight control components may be controlled by a control actuation system (CAS) including a processing component 120 that sends a signal to the flight control components to cause them to be engaged or deployed when it is desired to do so. Alternatively, the flight control components may be actively deployed or engaged. For example, with particular respect to the depicted tail fins, if the projectile or munition 100 is fired from the barrel of a gun or artillery system, then the tail fins may automatically extend, engage or deploy once the projectile or munition leaves the barrel of the gun or artillery. The processor or processing component 120 further preferably includes one or more algorithms adapted for performing the various image processing steps described herein for correcting or stabilizing motion in the image data that occurs due to travel and/or rotation of the projectile or munition 100 or environmental factors that act upon the projectile or munition 100 during flight. One or more such algorithms may be used, as described herein, and may include a feature selection algorithm, motion vector application algorithm, motion estimation algorithm, stabilization algorithm, smoothing algorithm, movement cancellation algorithm, or any combination such algorithms. The operation of these algorithms serves to take image data acquired by the image sensor 105 and correct or stabilize it to produce corrected image data that is relatively clear of motion errors or artifacts, and thus is readily able to be understood by a human observer. Preferably, these algorithms operate in real-time such that substantially instantaneously as the image data is acquired by the image sensor 105 it is processed and corrected such that there is substantially no delay in making the corrected data available to a user or separate system. The corrected or stabilized image data may be utilized to operate the CAS of the projectile or munition 100 in order to activate (or deactivate) the canards 110 or tail fins 115, or any other flight control mechanisms included on the given embodiment.

Figure 2:
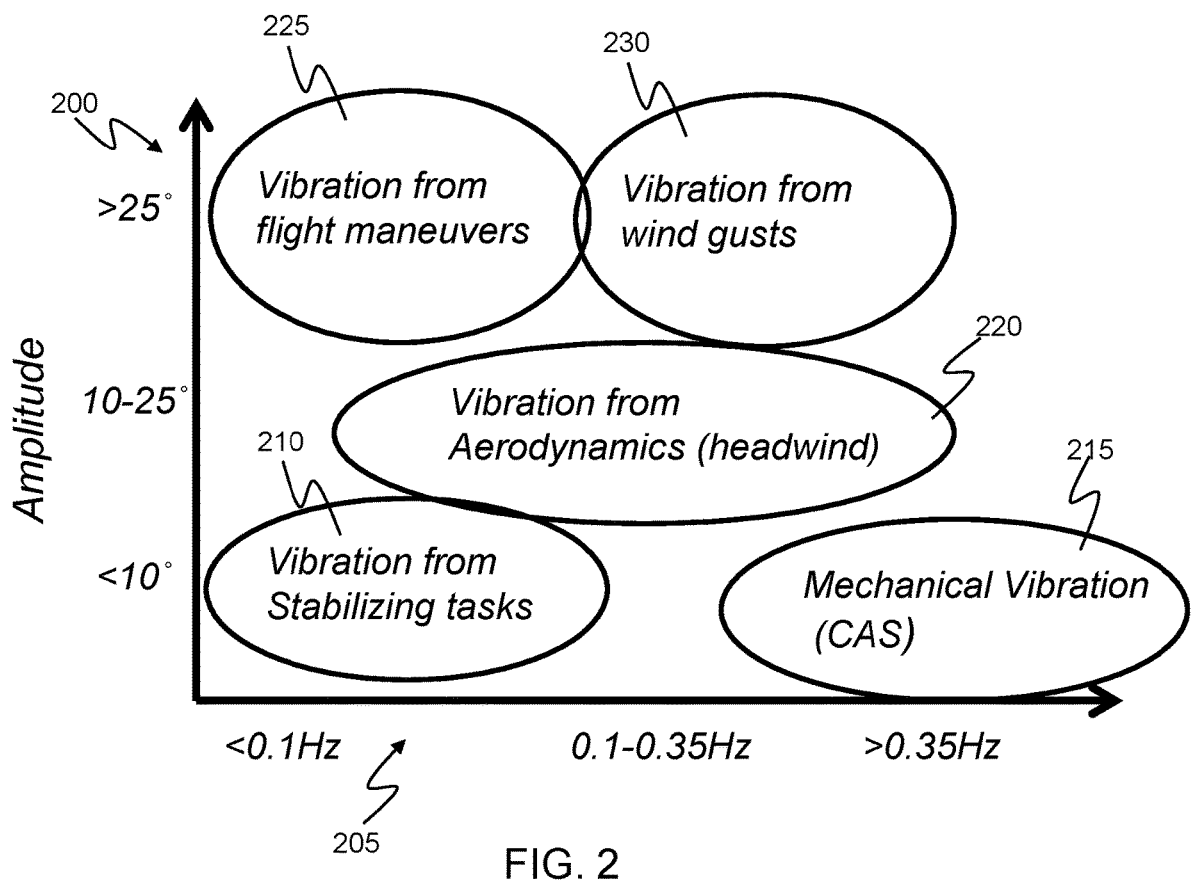
FIG. 2. Graph depicting common sources of motion errors in image data acquired during flight of a projectile or munition and relative amplitudes and frequencies of the motion or motion error.

FIG. 2 is a graph depicting common sources of motion errors in image data acquired during flight of a projectile or munition and relative amplitudes and frequencies of the motion or motion error. The vertical axis 200 of the graph represents amplitude of motion of the image sensor or of the image data acquired via the image sensor. The horizontal axis 205 of the graph represents the frequency of the movement. Within the graph are several types or sources of movement error in image data acquired during flight of a projectile or munition. One such source of error is vibration from stabilizing tasks 210 which are those tasks carried out within the projectile or munition that aim to stabilize the projectile or munition during flight. Vibration from stabilizing tasks 210 generally causes only low amplitude and low frequency image error. One other type of error includes vibration from mechanical sources 215, such as operation of the CAS, including activation or deployment of the flight control structures such as canards and the like. Vibration from mechanical sources 215 generally produces low amplitude but higher frequency vibrations in the image data. Yet another source of image motion or error includes aerodynamic vibration 220, which includes vibrations caused by sources such as the headwind during flight of the projectile or munition. Such aerodynamic vibrations 220 begin to increase in amplitude while covering a relatively large range of vibration frequencies. Still further increasing in vibration or motion amplitude, another source of such errors includes vibration from flight maneuvers 225. Vibrations from flight maneuvers 225 begin to produce high amplitude vibrations or errors, though they may be relatively low frequency vibrations, as the increased forces resulting from the movement of the projectile or munition increases. Yet another source of error or motion in image data includes vibration from wind gusts 230. Such vibrations from wind gusts can tend to produce high amplitude and high frequency vibrations or motion in the image data. The present invention is primarily directed at reducing or eliminating the error or motion image data caused by higher amplitude vibrations or movements in the image data and/or higher frequency vibrations or motion in the image data, such as the vibrations from aerodynamics 220, vibrations from flight maneuvers 225, or vibrations from wind gusts 230. The systems and methods of the present invention are uniquely suited for, and capable of, accurately reducing or eliminating motion effects in image data, whereas many known methods and systems are available for providing image correcting or stabilization for low-volatility errors or motions.

Figure 3:
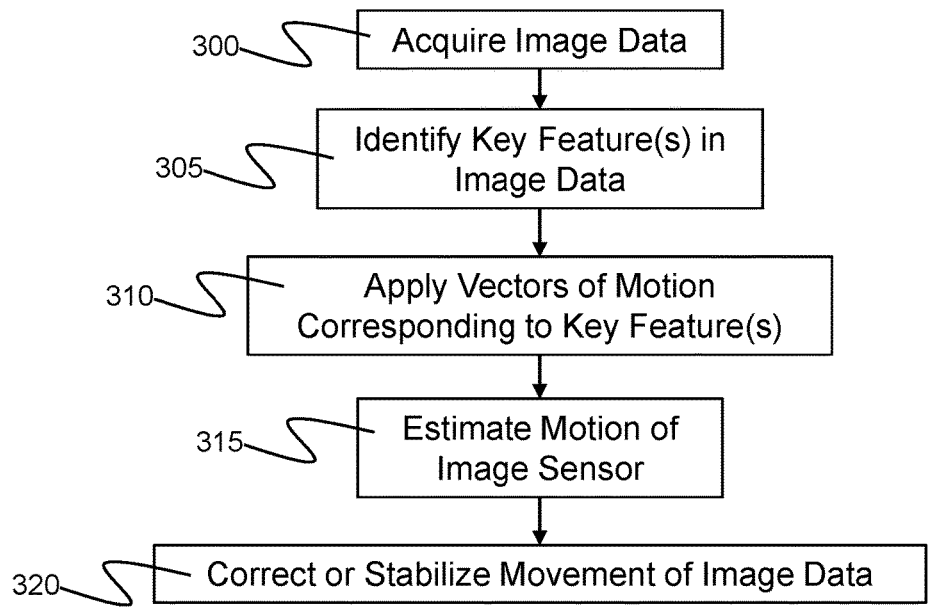
FIG. 3. Flow chart depicting a general overview of method embodiments of the present invention for providing image motion correction or stabilization.

FIG. 3 is a flow chart depicting a general overview of method embodiments of the present invention for providing image motion correction or stabilization. Initially, the first step of the image motion correction or stabilization process is to acquire image data 300. Acquiring image data can be performed using any type of image sensor known or developed for use particularly for capturing image data during flight of a projectile or munition. Once image data is acquire, the image may be filtered and converted from analog to digital form, depending on the type of image data acquired, or otherwise preprocessed to put the image data in a proper and convenient form for further processing and analysis. The next step is to identify key features 205 in the image data. Preferably, key features are present and identifiable in successive images or frames of the acquired image data. As noted above, key features may include landmarks, buildings, or other identifiable items present in the image data, or may be components of the image itself such as pixels or voxels. A feature identification algorithm may be used to calculate the most identifiable and suitable features to be identified as key features in the image data. Once one or more key features have been identified, those features can be tracked through successive images or frames of image data. Tracking the change in position of the identified key features between images or frames of image data allows the system to then apply vectors of motion 310 to the image data where those vectors of motion correspond to the perceived motion of the key features through the image data. The vectors of motion may preferably be applied by a motion vector application algorithm. The vectors of motion represent the direction and amplitude of the movement, and provide information on how the image sensor is moving during flight of the projectile or munition. The vectors of motion can then be used to perform the step of estimating motion of the image sensor 315. As noted, tracking the motion of the key features through the image data and noting the direction and amplitude or distance of such movement, allows a motion estimation algorithm to calculate an estimation of the motion of the image sensor itself, especially between successive images or frames of image data. Once the motion of the image sensor has been estimated, a correction or stabilization algorithm(s) can then adjust or align the consecutive images or frames of image data based on the vectors of motion, estimated motion of the image sensor, or combination of at least these two pieces of data.

Figure 4:
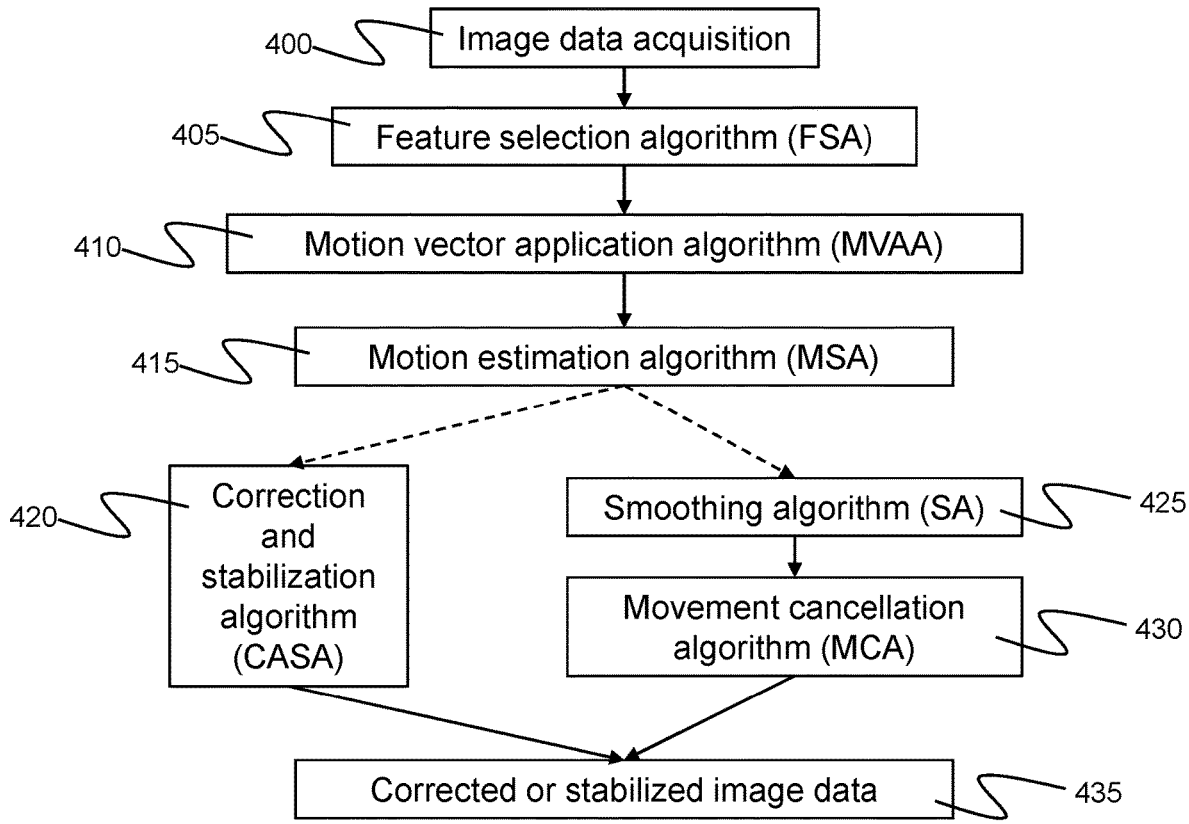
FIG. 4. Flow chart depicting the flow of information between components of system embodiments of the present invention for providing image motion correction or stabilization.

FIG. 4 is a flow chart depicting the flow of information between components of system embodiments of the present invention for providing image motion correction or stabilization. The flow chart depicted in the present figure follows the same flow as that of FIG. 3, but instead of the steps performed, it shows the various algorithms that can be used to perform each of the steps described in regard to FIG. 3 and above. Initially, image data acquisition 400 must occur in order to have signals or data to be processed. The acquired imaged data, after any preprocessing that may be performed, may enter a feature selection algorithm 405 that is adapted to identify key features in the image data that are identifiable and able to be identified and tracked through successive images or frames of image data. Once key feature(s) have been identified, a motion vector application algorithm 410 is applied, where the motion vector application algorithm 410 is adapted to assign or otherwise associate each identified key feature with a motion vector that represents the movement of the key feature between successive images or frames of image data. With the vector of motion applied to the image data or otherwise defined, a motion estimation algorithm 415 is applied where such algorithm is adapted to estimate the motion of the image sensor itself based on the movement of the key feature(s) between successive images or frames of image data. Then, once the image sensor movement has been estimated, one or more paths may be taken in order to actually apply image correction or stabilization to the successive images or frames of the image data. One option is to employ a combined correction and stabilization algorithm 420 which is adapted to directly align the successive images or frames of image data based on the estimated movement of the image sensor and possibly the vectors of motion associated with the key features. Alternatively, a two or more step process may be applied whereby a separate smoothing algorithm 425 and movement cancellation algorithm 430 are applied in succession or nearly simultaneously in order to provide image motion correction or stabilization and then to fine tune the alignment of the successive images or frames of image data. The smoothing algorithm 425 is adapted to perform the initial alignment and correction or motion by aligning the successive images or frames of image data in accordance with the estimated motion of the image sensor and possibly the vectors of motion associated with the key features. The movement cancellation algorithm 430 is adapted to perform the fine tuning and more precisely align the images in order to effectively and substantially cancel the appearance of any movement or motion artifact within the image data. Regardless of which path is taken, the end result is corrected or stabilized image data 435 that may be readily understood, analyzed, and potentially used for guidance or control of the projectile or munition, such as to be guided toward a target, or to change targets in flight.

Figure 5:
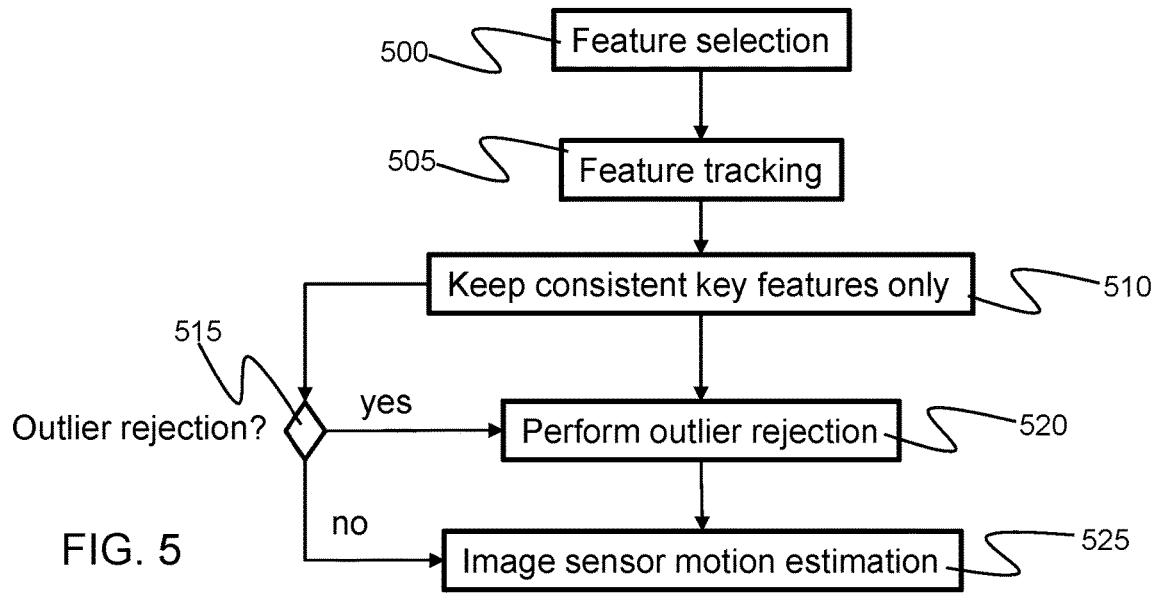
FIG. 5. Flow chart depicting the image correction or stabilization process with focus on the key feature selection and identification step.

FIG. 5 is a flow chart depicting the image correction or stabilization process with focus on the key feature selection and identification step. As noted above key feature selection 500 is performed by identifying one or more key features that are identifiable in successive images or frames of image data. Preferably, the one or more key features are selected by performing a calculation of to quality metric for a number of features, and only those features with a high enough quality metric value are selected as key features for use in the image motion correction or stabilization process. Once key features are selected 500, those key features are tracked 505 in successive images or frames of image data. Some identified and selected key features from one image or frame of image data may be eliminated from consideration if they are not consistent or repeated in successive images or frames of image data. Accordingly, only key features that are consistent between two or more images or frames of image data, those that correspond to more than a single image or frame, are kept 510 and possibly used for further analysis. In some embodiments, an outlier rejection decision 515 may be employed whereby it is decided whether to perform an outlier rejection 520 routine, or not. If the decision 515 is made to perform the outlier rejection 520, key features with certain attributes may be rejected even after being kept based on consistency and correspondence to multiple images or frames of image data. It may be desirable to eliminate key features with calculated quality measures that are outside of a certain standard deviation from the mean of those kept, for example. Alternatively, key features that are in a certain area or region of the image or image data may be rejected, for example pixels that are within a certain distance from the edge of the image. Whether an outlier rejection routine is performed 520 or not, the image data is then passed onto the motion estimation process in order to estimate the motion of the image sensor between successive images or frames of image data.

Figure 6:
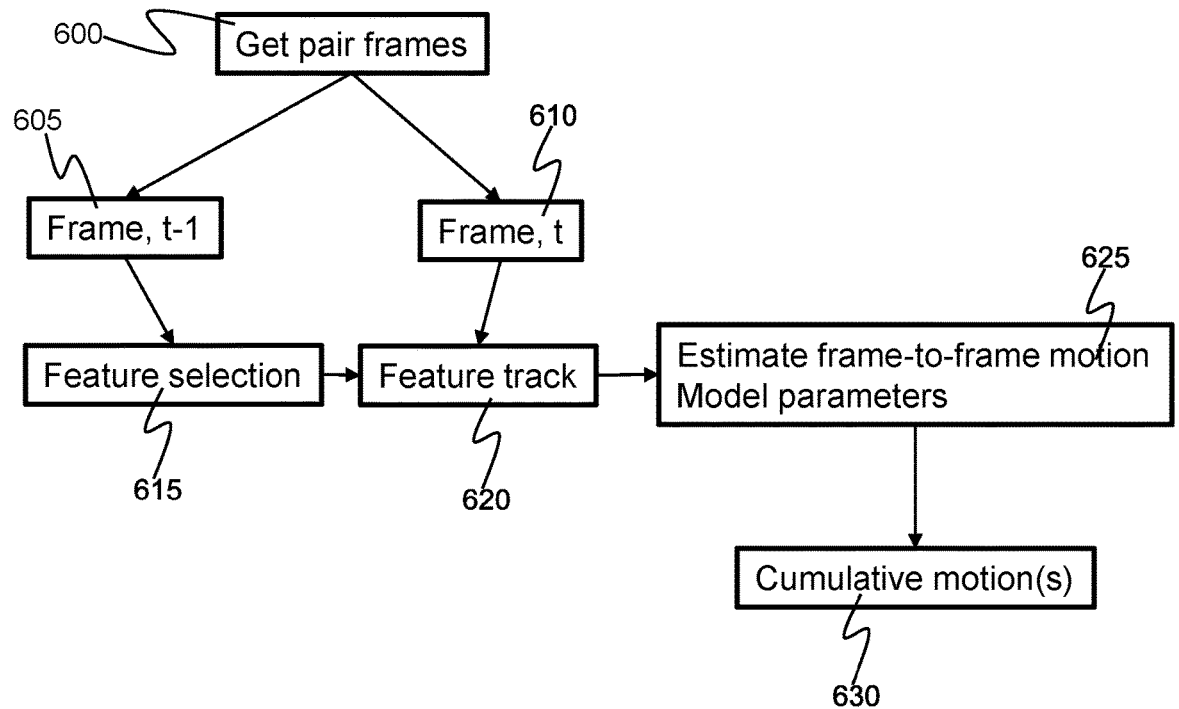
FIG. 6. Flow chart depicting the image correction or stabilization process with focus on the key feature selection and identification step, and more particularly the tracking of key features between images or frames of image data.

FIG. 6 is a flow chart depicting the image correction or stabilization process with focus on the key feature selection and identification step and more particularly the tracking of key features between images or frames of image data. The image sensor motion estimation process takes into account a pair of images or frames of image data 600. When evaluating an image or frame (t) 610, it is preferably paired with the immediately prior image or frame (t−1) 605. Further, the image or frame (t) 610 is preferably the present image or frame in that it is preferably the image or frame acquired at the present time when the system is operating substantially in real-time. The feature identification algorithm preferably identifies and selects 545 at least one key feature in the prior image or frame (t−1) 605, and then tracks 620 that/those identified key feature(s) in the present image or frame (t) 610. The feature tracking 620 process is that whereby the identified key feature(s) is/are identified in each image or frame of image data, and the movement between those frames (t−1, t) 605, 610 is measured and characterized in the form of vectors of motion that are associated with each identified key feature. The vectors of motion comprise information including the direction and amplitude of movement of the key feature(s) as well as the time taken to move in the observed manner which is known based on the times stamps of the successive images or frames of image data. The vectors of motion are then used to estimate the frame-to-frame motion 625 of the image sensor itself. The vectors of motion of the key feature(s) and the estimated motion 625 of the image sensor are used to create model parameters that estimate the motion from one frame to the next, and which together form a cumulative motion 630 model that can be applied to successive images or frames of image data to align the images or frames and to correct or stabilize the image data.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A real-time image motion correction or stabilization system for a projectile or munition in flight comprising:
    a projectile or munition comprising at least one image sensor adapted to acquire image data periodically or substantially continuously during flight of the projectile or munition, at least one inertial measurement unit (IMU), and a processor adapted to receive image data from the at least one sensor and movement data from the at least one IMU;
    a feature selection algorithm comprised in the processor and adapted to identify at least two key features in the image data based on the image data acquired during flight of the projectile or munition;
    a motion vector application algorithm comprised in the processor and adapted to apply vectors of motion corresponding to the at least two key features in the image data, the vectors of motion characterizing movement associated with the at least two key features within the image data;
    a motion estimation algorithm comprised in the processor and adapted to estimate motion of the image sensor based on the vectors of motion corresponding to the identified at least two key features in the image data by correlating a distance and direction of the movement associated with the at least two key features within the image data based at least in part on the vectors of motion; and
    a stabilization algorithm comprised in the processor and adapted to correct or stabilize movement of the image data based at least in part on the vectors of motion and the estimated motion of the image sensor by shifting one or more images or frames of image data based at least in part on the estimated motion.

2. The system of claim 1, further comprising at least one actuator adapted to activate and/or deactivate at least one activatable flow effector to guide the projectile or munition toward a target based at least in part on the corrected or stabilized image data.

3. The system of claim 2, wherein the processor is further adapted to correlate the movement data from the at least one IMU with the estimated motion and the stabilization algorithm is adapted to correct or stabilize the movement of the image data further based on the correlated movement and image data.

4. The system of claim 3, wherein the processor is further adapted to process the movement data to obtain body rates, linear accelerations, and magnetic disturbance measurements related to the movement of the projectile or munition, and to correlate the processed movement data with the image data to confirm the estimated motion and the measured movement data identify substantially the same movements of the projectile or munition.

5. The system of claim 4, wherein the at least one image sensor comprises at least two image sensors adapted to acquire image data, the at least two image sensors arranged on a single cross-sectional plane of the munition or projectile and arranged placed substantially equidistant from each other on the outer circumference of the munition or projectile.

6. The system of claim 5, wherein the feature selection algorithm is adapted to identify pixels or voxels as the key features, and is further adapted to calculate a corner quality measure at every pixel or voxel in the image data by calculating a covariation matrix of derivatives and computing eigenvalues.

7. The system of claim 6, wherein the feature selection algorithm is further adapted to sort the pixels or voxels according to their calculated quality measure and the pixels or voxels with the highest calculated quality measure are selected and identified as key features to be used in tracking and correction or stabilization of motion of the image data.

8. A real-time image motion correction or stabilization system for a projectile or munition in flight comprising:
    a projectile or munition comprising at least one image sensor adapted to acquire image data periodically or substantially continuously during flight of the projectile or munition, at least one inertial measurement unit (IMU), and a processor adapted to receive image data from the at least one sensor and movement data from the at least one IMU;
    a feature selection algorithm comprised in the processor and adapted to identify at least two key features in the image data based on the image data acquired during flight of the projectile or munition;
    a motion vector application algorithm comprised in the processor and adapted to apply vectors of motion corresponding to the at least two key features in the image data, the vectors of motion characterizing movement associated with the at least two key features within the image data;
    a motion estimation algorithm comprised in the processor and adapted to estimate motion of the image sensor based on the vectors of motion corresponding to the identified at least two key features in the image data by correlating a distance and direction of the movement associated with the at least two key features within the image data based at least in part on the vectors of motion; and
    a stabilization algorithm comprised in the processor and adapted to correct or stabilize movement of the image data based at least in part on the vectors of motion and the estimated motion of the image sensor by shifting one or more images or frames of image data based at least in part on the estimated motion,
    wherein motion of the image data exhibits an amplitude of 25 degrees or more and a frequency of 0.1 Hz or greater, and the processor and algorithms are adapted to perform the method on image data exhibiting such motion.

9. The system of claim 8, further comprising at least one actuator adapted to activate and/or deactivate at least one activatable flow effector to guide the projectile or munition toward a target based at least in part on the corrected or stabilized image data.

10. The system of claim 9, wherein the processor is further adapted to correlate the movement data from the at least one IMU with the estimated motion and the stabilization algorithm is adapted to correct or stabilize the movement of the image data further based on the correlated movement and image data.

11. The system of claim 10, wherein the processor is further adapted to process the movement data to obtain body rates, linear accelerations, and magnetic disturbance measurements related to the movement of the projectile or munition, and to correlate the processed movement data with the image data to confirm the estimated motion and the measured movement data identify substantially the same movements of the projectile or munition.

12. The system of claim 8, wherein the at least one image sensor comprises at least two image sensors adapted to acquire image data, the at least two image sensors arranged on a single cross-sectional plane of the munition or projectile and arranged placed substantially equidistant from each other on the outer circumference of the munition or projectile.

13. The system of claim 12, wherein the feature selection algorithm is adapted to identify pixels or voxels as the key features, and is further adapted to calculate a corner quality measure at every pixel or voxel in the image data by calculating a covariation matrix of derivatives and computing eigenvalues.

14. The system of claim 13, wherein the feature selection algorithm is further adapted to sort the pixels or voxels according to their calculated quality measure and the pixels or voxels with the highest calculated quality measure are selected and identified as key features to be used in tracking and correction or stabilization of motion of the image data.

15. A real-time image motion correction or stabilization system for a projectile or munition in flight comprising:
- a projectile or munition comprising at least one image sensor adapted to acquire image data periodically or substantially continuously during flight of the projectile or munition, at least one inertial measurement unit (IMU), and a processor adapted to receive image data from the at least one sensor and movement data from the at least one IMU;
- a feature selection algorithm comprised in the processor and adapted to identify at least one key feature in the image data acquired during flight of the projectile or munition;
- a motion vector application algorithm comprised in the processor and adapted to apply vectors of motion corresponding to the at least one key feature in the image data, the vectors of motion characterizing movement associated with the at least one key feature within the image data;
- a motion estimation algorithm comprised in the processor and adapted to estimate motion of the image sensor based on the vectors of motion corresponding to the identified at least one key feature in the image data by correlating a distance and direction of the movement associated with the at least at least one key feature within the image data based at least in part on the vectors of motion;
- a stabilization algorithm comprised in the processor and adapted to correct or stabilize movement of the image data based at least in part on the vectors of motion and the estimated motion of the image sensor by shifting one or more images or frames of image data based at least in part on the estimated motion; and
- at least one actuator adapted to activate and/or deactivate at least one activatable flow effector to guide the projectile or munition toward a target based at least in part on the corrected or stabilized image data.

16. The system of claim 15, wherein the processor is further adapted to correlate the movement data from the at least one IMU with the estimated motion and the stabilization algorithm is adapted to correct or stabilize the movement of the image data further based on the correlated movement and image data.

17. The system of claim 16, wherein the processor is further adapted to process the movement data to obtain body rates, linear accelerations, and magnetic disturbance measurements related to the movement of the projectile or munition, and to correlate the processed movement data with the image data to confirm the estimated motion and the measured movement data identify substantially the same movements of the projectile or munition.

18. The system of claim 17, wherein the at least one image sensor comprises at least two image sensors adapted to acquire image data, the at least two image sensors arranged on a single cross-sectional plane of the munition or projectile and arranged placed substantially equidistant from each other on the outer circumference of the munition or projectile.

19. The system of claim 18, wherein the feature selection algorithm is adapted to identify pixels or voxels as the key features, and is further adapted to calculate a corner quality measure at every pixel or voxel in the image data by calculating a covariation matrix of derivatives and computing eigenvalues.

20. The system of claim 19, wherein the feature selection algorithm is further adapted to sort the pixels or voxels according to their calculated quality measure and the pixels or voxels with the highest calculated quality measure are selected and identified as key features to be used in tracking and correction or stabilization of motion of the image data.

* * * * *